(12) United States Patent
Oldknow et al.

(10) Patent No.: US 9,592,841 B2
(45) Date of Patent: Mar. 14, 2017

(54) CUMULATIVE INERTIAL TRACTIVE EFFORT

(71) Applicants: L.B. FOSTER RAIL TECHNOLOGIES, CORP., Burnaby, British Columbia (CA); UNION PACIFIC RAILROAD, Omaha, NE (US)

(72) Inventors: Kevin David Oldknow, North Vancouver (CA); Wayne A. Kennedy, Mondamin, IA (US); John M. Peters, Elkhorn, NE (US); Srini Nedunoori, Omaha, NE (US); Divya Kadam, Ralston, NE (US)

(73) Assignees: L.B. FOSTER RAIL TECHNOLOGIES, CORP., Burnaby (CA); UNION PACIFIC RAILROAD, Omaha, NE (US)

( * ) Notice: Subject to any disclaimer, the term of this patent is extended or adjusted under 35 U.S.C. 154(b) by 61 days.

(21) Appl. No.: 14/633,795

(22) Filed: Feb. 27, 2015

(65) Prior Publication Data
US 2016/0251025 A1 Sep. 1, 2016

(51) Int. Cl.
*B61L 3/00* (2006.01)
*B61C 15/14* (2006.01)
(Continued)

(52) U.S. Cl.
CPC .............. *B61L 3/006* (2013.01); *B61C 15/08* (2013.01); *B61C 15/14* (2013.01); *B61C 17/08* (2013.01);
(Continued)

(58) Field of Classification Search
CPC . B61L 3/006; B61L 3/02; B61D 17/02; B61C 15/08; B61C 15/14; B61C 17/08
(Continued)

(56) References Cited

U.S. PATENT DOCUMENTS 5,173,204 A 12/1992 Chiddick et al.
5,308,516 A 5/1994 Chiddick
(Continued)

FOREIGN PATENT DOCUMENTS

CA 2 321 507 A1 3/2002
EP 1 357 175 A1 10/2003
(Continued)

OTHER PUBLICATIONS

U.S. Appl. No. 14/168,645 (Specification and Claims only).

*Primary Examiner* — Anne M Antonucci
(74) *Attorney, Agent, or Firm* — Arent Fox LLP

(57) ABSTRACT

A method to determine fuel consumption, energy consumption, or both fuel consumption and energy consumption, during one test train run, or a plurality of test train runs, that is associated with modifying an operating parameter is provided. The method includes determining a reference fuel/energy consumption, and a cumulative ITE for one, or a plurality of reference train runs ($CITE_{RR}$) over a portion of track, and correcting the reference fuel/energy consumption using the $CITE_{RR}$ of the one, or a plurality of reference train runs, to produce a corrected reference fuel/energy consumption value. The operating parameter is modified, and a modified fuel/energy consumption and cumulative ITE for the one, or a plurality of test train runs ($CITE_{TR}$), over the portion of track is determined, and a corrected test fuel/energy consumption value is obtained by correcting the modified fuel/energy consumption using the $CITE_{TR}$ of the one, or a plurality of test train runs. The corrected reference fuel/energy consumption value and the test fuel/energy consumption value are then compared to determine the effect of modifying the operating parameter on the fuel/energy consumption during the one test run, or a plurality of test train runs.

15 Claims, 4 Drawing Sheets

(51) Int. Cl.
*B61C 15/08* (2006.01)
*B61C 17/08* (2006.01)
*B61D 17/02* (2006.01)
*B61L 3/02* (2006.01)
*B61L 15/00* (2006.01)

(52) U.S. Cl.
CPC .......... *B61D 17/02* (2013.01); *B61L 15/0072* (2013.01); *B61L 15/0081* (2013.01)

(58) Field of Classification Search
USPC .......................................................... 701/19
See application file for complete search history.

(56) References Cited

U.S. PATENT DOCUMENTS

| | | |
|---|---|---|
| 5,492,642 A | 2/1996 | Mulvihill et al. |
| 6,136,757 A | 10/2000 | Chiddick |
| 6,332,106 B1 | 12/2001 | Hawthorne et al. |
| 6,387,854 B1 | 5/2002 | Sedelmeier et al. |
| 6,748,303 B2 | 6/2004 | Hawthorne |
| 6,795,372 B2 | 9/2004 | Kim et al. |
| 6,855,673 B2 | 2/2005 | Cotter et al. |
| 7,045,489 B2 | 5/2006 | Cotter et al. |
| 7,188,341 B1 | 3/2007 | Hawthorne et al. |
| 7,244,695 B2 | 7/2007 | Eadie |
| 7,357,427 B2 | 4/2008 | Eadie et al. |
| 7,647,141 B2 | 1/2010 | Foster et al. |
| 7,709,426 B2 | 5/2010 | Eadie et al. |
| 8,370,007 B2 | 2/2013 | Brooks et al. |
| 8,751,073 B2 | 6/2014 | Kumar et al. |
| 2003/0195123 A1 | 10/2003 | Cotter |
| 2004/0038831 A1 | 2/2004 | Eadie |

FOREIGN PATENT DOCUMENTS

| | | |
|---|---|---|
| EP | 1 418 222 A2 | 5/2004 |
| WO | WO 98/13445 A1 | 4/1998 |
| WO | WO 2006/084386 A1 | 8/2006 |
| WO | WO 2008/089572 A1 | 7/2008 |

CUMULATIVE INERTIAL TRACTIVE EFFORT

FIELD OF THE INVENTION

The present invention relates to evaluating train performance. In particular, the present invention relates to a method for analyzing train performance in response to varying an operating parameter of the train.

BACKGROUND OF THE INVENTION

Monitoring and improving operating efficiencies such as timetable optimization, energy consumption, and other operating variables during train operation is ongoing in the railway industry.

U.S. application Ser. No. 14/168,645 discloses methods and systems for optimizing energy consumption along a train line by synchronizing two more vehicles on the train line. Timetables for a train line are used and optimized based on aggregated information/data. The data may include, for example, dwell time, departure time, arrival time, train patterns/trip linking, energy profiles, origin/destination matrix, speed profile, and is standardized against a reference level and variations in driver behaviour accounted for. Timetables of trains in real time are adjusted based on the collected data.

U.S. Pat. No. 8,751,073, and U.S. Pat. No. 8,370,007 describe a trip optimization system that involves determining a driving strategy of a train. A trip plan is created using input information including, train position, consist composition, locomotive tractive power performance of locomotive traction transmission, consumption of engine fuel as a function of output power, cooling characteristics, intended trip route, car makeup and loading, desired trip parameters, and a trip profile is computed. A quantitative objective function, comprising a weighted sum of model variables that correspond to a fuel consumption rate and emissions generated plus a term to penalize excess throttle variations, is used to calculate the trip profile. Real-time train data is used to estimate locomotive and/or train parameters, and the estimated parameters are compared to the input information. Any differences between the estimated parameters and input information are used to modify the trip plan in real time. Additionally, a train parameter may be adjusted based on the data collected.

U.S. Pat. No. 6,748,303 teaches a method of analyzing train operational data collected onboard a train. Operational and informational parameters are derived from the operational data for each run and the operational parameters are compared to selected exception values. The operational parameters may include fuel consumption, in-train forces, time to destination, speed limit adherence, air brake preference and dynamic brake preference. A train performance analysis (TPA) report is created and a target run (i.e. an optimal performance prediction of the run under analysis) may be created.

U.S. Pat. No. 7,188,341 discloses a method of adjusting a simulator and processing data from an event recorder of a train. The parameters that are adjusted include grade resistance, curve resistance, rolling resistance, tractive effect of trains, locomotives, dynamic brake effect of the train's locomotives, pneumatic brake system and train weight. The input data is analyzed on the simulator, and any anomalies that are identified, along with the information about the train (location, time, crew, train makeup, railroad, log file numbers) is used to for further analysis and/or real time adjustment. U.S. Pat. No. 7,647,141 also teaches the use of a simulator in real time.

U.S. Pat. No. 6,332,106 teaches a method for analyzing train handling by setting a standard for a train run, and then collecting train operating and handling data from the actual run, determining operating constraints during the run which are not included in the standard run, and determining the differences between the operating constraints during the run to those included in the standard run. The train handling data is compared to the standard and the comparison is adjusted for the operating constraints and used to penalize driver behaviour. Operating constraints include, for e.g., speed limits, special slow orders, speed restriction zones, meets and passes, track occupancy permits, general operating bulletins, upcoming signal designations, desired time of arrival, final destination location, limit of authority or track locations to which train may move without possibility of interfering with the movement of the trains in the area)

Operation efficiencies of a train may also be varied by modifying one or more operating parameters during a train run. Example of operating parameters that may be modified may include, but are not limited to, the type of fuel used to operate the train, type and location of aerodynamic faring, use of a wind skirt, acceleration, deceleration of the train over a railroad track, altering time-in-notch patterns, application of one or more friction control composition, location of application of the friction control composition, and the like.

In order to assess the value of using or modifying a particular operating parameter, data on train runs and a train's performance may be collected and used to analyze the impact of using or modifying a particular operating parameter. This data is typically collected during regular train runs (i.e. field conditions) as opposed to data collected in a controlled environment such as a test track. Determining the actual impact of these modifications on a train's performance under field conditions with confidence, including, without limitation, fuel consumption, energy consumption or both fuel consumption and energy consumption, however, is challenging. Although a significant amount of data can be collected during a train run, the analysis of this data to quantify the impact of various operating parameters on train performance under field conditions may be limited due to the variability in the data between different train runs. The variability in the data may arise from a number of different sources, including environmental factors, such as wind, rain, snow, and other factors, such as driver behaviour.

SUMMARY OF THE INVENTION

The present invention relates to evaluating train performance. In particular, the present invention relates to a method for analyzing train performance in response to varying an operating parameter of the train.

The present disclosure relates generally to a method for analyzing a train's performance in response to varying an operating parameter of the train. In addition, the present disclosure relates to a parameter that can be calculated for a train run and the use of the parameter in determining the impact of changing an operating parameter on train performance with increased confidence.

A method is provided that produces an explanatory variable, a cumulative ITE (cITE), that helps reduce the degree of uncertainty in an analysis of determining the impact or effect of an operating parameter on fuel consumption, energy consumption, or both fuel consumption and energy consumption, during a train run that is associated with modifying the operating parameter (i.e. a test train run).

As described herein there is provided a method (A) to determine fuel consumption, energy consumption, or both fuel consumption and energy consumption, during a test train run that is associated with modifying an operating parameter, comprising:

i) determining a reference fuel consumption, reference energy consumption, or both the reference fuel consumption and the reference energy consumption, and a cumulative ITE for a reference train run ($CITE_{RR}$) over a portion of track, and correcting the reference fuel consumption, the reference energy consumption, or both the reference fuel consumption and the reference energy consumption, of the reference run using the $CITE_{RR}$ of the reference train run, to produce a corrected reference fuel/energy consumption value;

ii) modifying the operating parameter, and determining a modified fuel consumption, a modified energy consumption, or both the modified fuel consumption and the modified energy consumption, and cumulative ITE for the test train run ($CITE_{TR}$) over the portion of track, and correcting the modified fuel consumption, the modified energy consumption, or both the modified fuel consumption and the modified energy consumption, for the test train run using the $CITE_{TR}$ of the test train run to obtain a corrected test fuel/energy consumption value; and iii) comparing the corrected reference fuel/energy consumption value and the test fuel/energy consumption value to determine the effect of modifying the operating parameter on the fuel consumption, the energy consumption, or both the fuel consumption and the energy consumption, during the test train run.

Also provided is the method (A) as described above, wherein in the step of comparing (step iii), any variations in tonnage between the reference train run and the test train run are corrected for.

Also described herein is a method (B) to determine fuel consumption, energy consumption, or both fuel consumption and energy consumption, during a test train run that is associated with modifying an operating parameter comprising, i) modifying an operating parameter, and determining a modified fuel consumption, a modified energy consumption, or both the modified fuel consumption and the modified energy consumption, and cumulative ITE for the test train run ($CITE_{TR}$) over a portion of track, and correcting the modified fuel consumption, the modified energy consumption, or both the modified fuel consumption and the modified energy consumption, for the test train run using the $CITE_{TR}$ of the test train run to obtain a corrected test fuel/energy consumption value; and ii) comparing the corrected test fuel/energy consumption value with a predetermined corrected reference fuel/energy consumption value to determine the effect of modifying the operating parameter on the fuel consumption, the energy consumption, or both the fuel consumption and the energy consumption, during the test train run.

Furthermore, in the step of comparing (step ii) of the method (B) as described above, the predetermined reference fuel/energy consumption value may be obtained by determining a reference fuel consumption, reference energy consumption, or both the reference fuel consumption and the reference energy consumption, and a cumulative ITE for a reference train run ($CITE_{RR}$) over the portion of track, and correcting the reference fuel consumption, the reference energy consumption, or both the reference fuel consumption and the reference energy consumption, of the reference run using the $CITE_{RR}$ of the reference train run, to produce the predetermined corrected reference fuel/energy consumption value.

Also provided is the method (B) as described above, wherein in the step of comparing (step ii), any variations in tonnage between the reference train run and the test train run are corrected for.

The present disclosure also provides the method (A) or (B) as described above, wherein the corrected reference fuel/energy consumption value may be obtained for a plurality of reference train runs and each of the corrected reference fuel/energy consumption values are averaged before the step of comparing. Similarly, the corrected test fuel/energy consumption value may be obtained for a plurality of test train runs and each of the corrected test fuel/energy consumption values are averaged before the step of comparing.

The present disclosure also provides the method (A) or (B) as described above, wherein the operating parameter may be selected from the group of an application of a friction control modifier to a rail or wheel surface, a change in the type of fuel used, using or modifying an aerodynamic faring, using or modifying a wind skirt, modifying wheel bearings, modifying wheel bearing grease, modifying a wheel material, altering acceleration, deceleration or bother acceleration and deceleration during certain segments of a track, or altering rail track configuration.

Driver or operator behaviour, including acceleration/deceleration and corresponding time-in-notch patterns, can produce variations in fuel consumption over the same territory that make differences obtained by changing an operating parameter difficult to determine under filed conditions. Variations in driver behaviour between train runs may mask a correlation that might otherwise be observed between an operating parameter and fuel consumption or any other train performance parameter, and reduce the statistical confidence in the resulting calculated energy or fuel savings. The methods described herein provide a correction factor, or an explanatory variable—the cumulative ITE (cITE)—that may be used to determine the effect of modifying an operating parameter on the fuel/energy consumption of a train during a test train run.

Further aspects of the invention will become apparent from consideration of the ensuing description of exemplary embodiments of the present invention. A person skilled in the art will realise that other embodiments of the invention are possible and that the details of the invention can be modified in a number of respects, all without departing from the inventive concept. Thus, the following drawings, descriptions and examples are to be regarded as illustrative in nature and not restrictive.

BRIEF DESCRIPTION OF THE DRAWINGS

These and other features of the invention will become more apparent in the following detailed description in which reference is made to the appended drawings.

FIG. 1A shows a schematic of train movement and several forces that are involved during movement. The upper portion of FIG. 1A shows a train (mass, m) moving at a constant velocity (v). Total tractive effort ($F_{TE}$) applied by one or more locomotive balances resistance due to for example, rolling ($R_{tangent}$), curves ($R_{curves}$), grades ($R_{grade}$) and wind ($R_{wind}$). In the lower portion of FIG. 1A, the same train (mass, m; moving at velocity, v) is under acceleration (a). The one or more locomotive must apply an additional force, an "Inertial Tractive Effort" ($F_{ITE}$), to overcome the inertial resistance to acceleration (ma). FIG. 1B shows a schematic of a train passing over a change in grade, $V_0$: speed of train at rest; $V_1$: speed of train following acceleration by gravity (no throttle applied); $V_2$: speed of train at top of grade following application of throttle; $V_f$: speed of train following de-acceleration with no throttle applied, to rest (zero velocity).

FIG. 4A shows fuel consumption plotted against cumulative ITE (ITE). FIG. 4B shows analysis of covariance for fuel consumption (plotted against cumulative ITE). Upper line (FIG. 4B): regression line for reference (control) train runs operated in absence of any modification in an operating parameter; Lower line: regression line of test train runs that were carried out with a top of rail friction modifier applied during the train run (i.e. an operating parameter).

DETAILED DESCRIPTION OF THE INVENTION

Figure 1A:
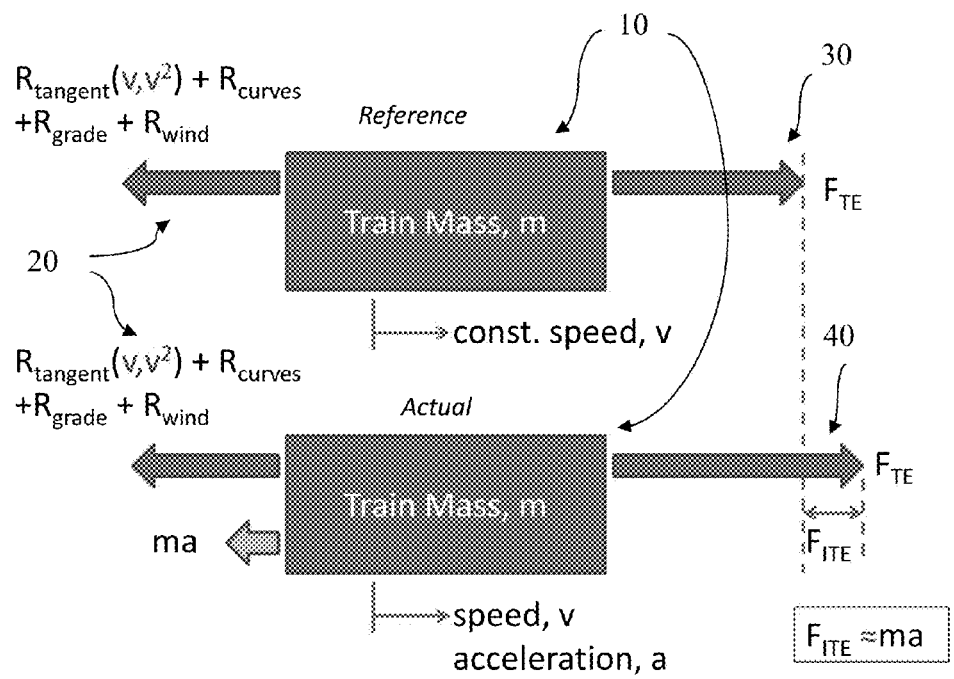
FIGS. 1A and 1B show a summary of several forces that impact fuel/energy consumption of a train during a portion of a train run.

The present invention relates to evaluating train performance. In particular, the present invention relates to a method for analyzing train performance in response to varying an operating parameter of the train.

Throughout the following description, specific details are set forth in order to provide a more thorough understanding of the present invention. However, the present invention may be practiced without these specific particulars. In other instances, well known elements have not been shown or described in detail to avoid unnecessarily obscuring the invention. Accordingly, the specification and drawings are to be regarded in an illustrative, rather than a restrictive sense.

As used herein, the terms "comprising," "having," "including" and "containing," and grammatical variations thereof, are inclusive or open-ended and do not exclude additional, un-recited elements and/or method steps. The term "consisting essentially of" when used herein in connection with a use or method, denotes that additional elements and/or method steps may be present, but that these additions do not materially affect the manner in which the recited method or use functions. The term "consisting of" when used herein in connection with a use or method, excludes the presence of additional elements and/or method steps. A use or method described herein as comprising certain elements and/or steps may also, in certain embodiments consist essentially of those elements and/or steps, and in other embodiments consist of those elements and/or steps, whether or not these embodiments are specifically referred to. In addition, the use of the singular includes the plural, and "or" means "and/or" unless otherwise stated. The term "plurality" as used herein means more than one, for example, two or more, three or more, four or more, and the like. Unless otherwise defined herein, all technical and scientific terms used herein have the same meaning as commonly understood by one of ordinary skill in the art. As used herein, the term "about" refers to an approximately +/−10% variation from a given value. It is to be understood that such a variation is always included in any given value provided herein, whether or not it is specifically referred to. The use of the word "a" or "an" when used herein in conjunction with the term "comprising" may mean "one," but it is also consistent with the meaning of "one or more," "at least one" and "one or more than one."

The present disclosure relates to a method for analyzing a train's performance in response to varying an operating parameter of the train. This method involves calculating a "cumulative inertial tractive effort", "also called cumulative ITE" or "cITE", for a train run, and using the variable to determine the impact of changing an operating parameter on train performance. As described herein, the use of cITE results in evaluating the effect of the operating (or operation) parameter on the train run with increased confidence. The present disclosure, therefore, relates to a single variable, the cITE, for determining the effect of using or modifying an operating parameter on a train's performance (fuel/energy consumption), and a use of the single variable in determining the impact of using or changing the operating parameter on the fuel/energy consumption by the train during a train run with increased confidence.

The term "fuel/energy consumption value" is used as short hand to mean "a fuel consumption value, an energy consumption value, or both a fuel consumption value and an energy consumption value" by a train during a train run. Similarly, "fuel/energy consumption" is used as short hand to mean "fuel consumption, energy consumption, or both fuel consumption and energy consumption" by the train during the train run.

The term "reference fuel/energy consumption" is used as short hand to mean "reference fuel consumption, reference energy consumption, or both reference fuel consumption and reference energy consumption" obtained during or after a reference train run. Similarly, "modified fuel/energy consumption" is used as shorthand to mean "modified fuel consumption, modified energy consumption, or both modified fuel consumption and modified energy consumption" obtained during or after a test train run.

A reference train run refers to a train run taking place without using a modified operating parameter, or a change in the operating parameter. A reference train run typically comprises the same features within the train and rail track, or portion of track, that are used during a test train run, but the reference train run is carried out in the absence of the modified operating parameter. Some, additional modifications may differ between the reference train run and the test train run, provided that the additional modification(s) may be corrected for during processing of the data obtained during, or after, the test train run. For example, additional modifications may include variation in the weight of train, variation in the train load; variation in the length of train, variation in the number of rail cars, or a combination thereof. The effect of these additional modifications on fuel/energy consumption during the test train run can be corrected for, as further described below, in order for the data from reference train run to be used as described herein.

A test train run refers to a train run that takes place with an applied operating parameter, or a change in an operating parameter, being used during the train run. A test train run typically comprises the same features within the train and rail track that are used during the reference train run, however, the test train run also includes the modified operating parameter. Preferably, the operating parameter is the only modification being made during a test train run when compared to the reference train run. However, additional modifications may also be made during a test train run, provided that the additional modification(s) may be corrected for during processing of the data obtained during, or after, the test train run. For example, additional modifications may include variation in the weight of train, variation in the train load; variation in the length of train, variation in the number of rail cars, or a combination thereof. The effect of these additional modifications on fuel/energy consumption during the test train run can be corrected for, as described below, when the effect of modifying the operating parameter during the test train run is determined.

Any portion or segment of track may be used for a train run. Preferably the portion of track is of a length that is sufficient to determine an effect obtained from modifying an operating parameter on fuel/energy consumption of the train. For example, the portion of track may be of about 0.5 km to about 2500 km in length, or any length therebetween, for example 0.5, 1.0, 5.0, 10.0, 25, 50, 75, 100, 250, 500, 750, 1000, 1,500, 2,000, 2,500 km in length, or any length therebetween. A portion of track used for a train run may be of an open track, or a closed-loop track, configuration. The start and end point of the portion of track used for the reference and test train runs should be the same.

An "operating parameter", or an "operation parameter", refers to a parameter that is to be evaluated during a test train run. Non limiting examples of an operating parameter may include, application of a friction control modifier to a rail or wheel surface, a change in the type of fuel used, using or modifying an aerodynamic faring, using or modifying a wind skirt, modifying wheel bearings, modifying wheel bearing grease, modifying a wheel material, altering rail track configuration (e.g. changes in track elevation; change in curve geometry of the track). The effect of the operating parameter on fuel/energy consumption during a train run may be determined using the methods as described herein. Preferably, the operating parameter is the only modification being made to the train or train track during a test train run.

Examples of friction modifying compositions are known in the art and may include solid, liquid or paste-like friction control media for example, but are not limited to, those described in U.S. Pat. No. 5,173,204; U.S. Pat. No. 5,308,516; U.S. Pat. No. 6,136,757; U.S. Pat. No. 6,387,854; U.S. Pat. No. 5,492,642; US 2004 0038831 A1; WO 02/26919 (US 2003 0 195 123 A1); WO 98/13445; CA 2,321,507; EP 1 357 175; EP 1 418 222; U.S. Pat. No. 6,795,372; U.S. Pat. No. 6,855,673; U.S. Pat. No. 7,045,489; U.S. Pat. No. 7,244,695; U.S. Pat. No. 7,357,427; U.S. Pat. No. 7,709,426; WO 2006/084386; WO 2008/089572 (which are incorporated herein by reference).

As described herein, there is provided a method to determine fuel consumption, energy consumption, or both fuel consumption and energy consumption (i.e. fuel/energy consumption), during a test train run, or two or more than two test train runs, that is associated with using or modifying an operation parameter. The method involves:

i) determining a reference fuel consumption, a reference energy consumption, or both the reference fuel consumption and the reference energy consumption (reference fuel/energy consumption), and a cumulative ITE for a reference train run, or two or more than two reference train runs ($cITE_{RR}$), and correcting the reference fuel/energy consumption of the reference train run, or two or more than two reference train runs, using the $cITE_{RR}$, to produce a corrected reference fuel/energy consumption value;

ii) using or modifying an operating parameter, and determining a modified fuel consumption, a modified energy consumption, or both the modified fuel consumption and the modified energy consumption (modified fuel/energy consumption), and a cumulative ITE for the test train run, or two or more than two test train runs ($cITE_{TR}$), and correcting the modified fuel/energy consumption for the test train run, or two or more than two test train runs, using the $cITE_{TR}$, to obtain a corrected test fuel/energy consumption value; and iii) comparing the corrected reference fuel/energy consumption value and the test fuel/energy consumption value to determine the effect of modifying the operating parameter on the fuel/energy consumption during the test train run, or two or more than two test train runs.

As one of skill in the art would appreciate, multiple, or a plurality of reference train runs, and multiple or a plurality, of test train runs may need to be carried out in order to obtain a statistically meaningful result that results from using or modifying the operating parameter. For example, three or more than three reference train runs, and three or more than three test train runs, may be required to obtain a statistically meaningful result, or five or more than five reference train runs, and five or more than five test train runs, may be required to obtain a statistically meaningful result. Additionally, 10 or more than 10 reference train runs, and 10 or more than 10 test train runs, may be required to obtain a statistically meaningful result. For example which is not to be considered limiting, from 2 to about 2,500, or any amount there between, reference train runs, and 2 to about 2,500, or any amount there between, test train runs, may be used to obtain a statistically meaningful results. As one of skill in the art would recognize, more than 2,500 reference, and test, train runs may be performed in order to obtain statistically meaningful results.

In the step of comparing (step iii), if the operating parameter reduces the fuel/energy consumption, then the corrected test fuel/energy consumption value will be less than that of the corrected reference fuel/energy consumption value. Alternatively, if the operating parameter has no effect or increases fuel/energy consumption, then the corrected test fuel/energy consumption value will be the same as, or greater than, respectively, the corrected reference fuel/energy consumption value.

The corrected reference fuel/energy consumption value that is obtained for a reference train run, or two or more than two reference train runs, may be predetermined and saved in a database for future reference for comparison to a test train run. For example, a portion of track may be regularly used by trains having similar lengths and similar loads to that of the test train run. Data obtained from one, two, or more of such train runs may be obtained and retained in the database for use as one, two, or more reference train runs. Furthermore, the stored data for each of the one, two or more reference train runs may be corrected as described herein, using a cumulative ITE for each reference train run ($cITE_{RR}$), so that a corrected reference fuel/energy consumption value for each reference train run is obtained and stored in the database. The corrected reference fuel/energy consumption values for the one, two, or more reference train runs may also be combined and averaged, to obtain an average corrected reference fuel/energy consumption value for the portion of track.

Therefore, not all of the steps as described in the above method may be required to determine the effect of modifying an operating parameter on fuel efficiency. For example, an alternate method to determine fuel consumption, energy consumption, or both fuel consumption and energy consumption, during a test train run, or two or more than two test train runs, that is associated with using or modifying an operation parameter may comprise:

i) using or modifying an operating parameter, and determining a modified fuel consumption, a modified energy consumption, or both the modified fuel consumption and the modified energy consumption, and cumulative ITE for the test train run, or two or more than two test train runs (cITE$_{TR}$), and correcting the modified fuel consumption, the modified energy consumption, or both the modified fuel consumption and the modified energy consumption, for the test run, or the two or more than two test train runs, using the cITE$_{TR}$ of the test run, or two or more than two test train runs, to obtain a corrected test fuel/energy consumption value; and ii) comparing the corrected reference fuel/energy consumption value with a predetermined corrected test fuel/energy consumption value to determine the effect of modifying the operating parameter on the fuel consumption, the energy consumption, or both the fuel consumption and the energy consumption, during the test train run, or two or more than two test train runs.

In the step of comparing (step ii), if the operating parameter reduces fuel/energy consumption, then the corrected test fuel/energy consumption value will be less that of the corrected reference fuel/energy consumption value. Alternatively, if the operating parameter has no effect or increases fuel/energy consumption, then the corrected test fuel/energy consumption value will be the same as, or greater than, respectively, the corrected reference fuel/energy consumption value.

As noted above, multiple or a plurality of reference train runs, and multiple or a plurality of test train runs may need to be carried out in order to obtain a statistically meaningful result that results from using or modifying the operating parameter. For example, three or more than three reference train runs, and three or more than three test train runs, may be required to obtain a statistically meaningful result, or five or more than five reference train runs, and five or more than five test train runs, may be required to obtain a statistically meaningful result. Additionally, 10 or more than 10 reference train runs, and 10 or more than 10 test train runs, may be required to obtain a statistically meaningful result. For example which is not to be considered limiting, from 2 to about 2,500, or any amount there between, reference train runs, and 2 to about 2,500, or any amount there between, test train runs, may be used to obtain a statistically meaningful results. As one of skill in the art would recognize, more than 2,500 reference, and test, train runs may be performed in order to obtain statistically meaningful results.

Alternatively, the method to determine fuel consumption, energy consumption, or both fuel consumption and energy consumption, during a test train run, or two or more than two test train runs, that is associated with using or modifying an operation parameter may comprise:

i) using or modifying an operating parameter, and determining a modified fuel consumption, a modified energy consumption, or both the modified fuel consumption and the modified energy consumption, and cumulative ITE for a test train run (cITE$_{TR}$), and correcting the modified fuel consumption, the modified energy consumption, or both the modified fuel consumption and the modified energy consumption, for the test run, or two or more than two test train runs, using the cITE$_{TR}$ of the test run, or two or more than two test train runs, to obtain a corrected test fuel/energy consumption value; and ii) determining the effect of the operating parameter on fuel/energy consumption. If the operating parameter reduces fuel/energy consumption, then the corrected test fuel/energy consumption value will be less that of a predetermined corrected reference fuel/energy consumption value. If the operating parameter has no effect or increases fuel/energy consumption, then the corrected test fuel/energy consumption value will be the same as, or greater than, respectively, the predetermined corrected reference fuel/energy consumption value.

As noted above, multiple or a plurality of reference train runs, and multiple or a plurality of test train runs may need to be carried out in order to obtain a statistically meaningful result that results from using or modifying the operating parameter. For example, three or more than three reference train runs, and three or more than three test train runs, may be required to obtain a statistically meaningful result, or five or more than five reference train runs, and five or more than five test train runs, may be required to obtain a statistically meaningful result. Additionally, 10 or more than 10 reference train runs, and 10 or more than 10 test train runs, may be required to obtain a statistically meaningful result. For example which is not to be considered limiting, from 2 to about 2,500, or any amount there between, reference train runs, and 2 to about 2,500, or any amount there between, test train runs, may be used to obtain a statistically meaningful results. As one of skill in the art would recognize, more than 2,500 reference, and test, train runs may be performed in order to obtain statistically meaningful results.

To determine an effect of an operating parameter on a train's performance, including a train's fuel consumption, energy consumption, or both fuel and energy consumption, one or more than one operating parameters may be altered, and the effect of the modified operating parameter on train performance assessed. Quantifying the impact of using or altering an operating parameter has been challenging, despite the ability within the art to collect data during train operation. Testing of a modified operating parameter may occur under field conditions during a regular train run, rather than under control conditions using a test track. The difficulty to quantify the effect that arises from modifying an operating parameter on a train's performance is mainly due to the variability in the data collected under field conditions for different train runs. In particular, variability in train performance as measured by fuel consumption, energy consumption of both fuel and energy consumption that results from different train handling by different train operators.

Driver or operator behaviour, such as acceleration/deceleration and corresponding time-in-notch patterns, can produce variations in train performance over the same territory that can obscure differences that may result from using or changing an operating parameter. This has the overall effect of masking any correlation that might otherwise be attributable to changing an operating parameter and determining its impact on fuel/energy consumption or other train performance criteria. This variability also reduces the statistical confidence in the resulting calculated fuel savings.

The present disclosure is, therefore, directed at generating and applying a simplified method for managing the variability in the data and increasing the statistical confidence in determining the impact of an operating parameter on fuel/energy consumption during a train run. The method involves determining a parameter, the cumulative ITE (cITE), which is correlated with fuel/energy consumption and can be calculated using readily available information from each train run. cITE is an explanatory variable, that helps to reduce the degree of uncertainty in the analysis of the impacts of a given change (e.g. introduction of a new technology) on locomotive fuel consumption cITE may be calculated from a train run and is used to distil the effects of a driver's behaviour, a driver's train handling, or both a driver's behaviour and train handling, and other operational variables, during the train run. cITE may be used as a correction factor, or explanatory variable, when analyzing the impact of an operating parameter on a train's performance. By using this correction factor, the impact of using or modifying an operating parameter on fuel/energy consumption during a train run can be analyzed and determined with greater degree of confidence, when compared to evaluating the effect of using or modifying the same operating parameter during a train run without correcting for driver behaviour, or other operational variables, using cITE.

The cumulative inertial tractive effort, or cITE, is calculated during or after a train run and estimates the energy spent on inertial effects (i.e. acceleration/deceleration v. the same, or a similar train travelling at a constant speed) during or over a given run. cITE is determined by integrating the inertial tractive power as follows:

cITE is given as:

$$cITE = \int F_{ITE}(t) * v(t) dt$$

where $F_{ITE}$ is the inertial tractive effort and is calculated as:

$$F_{ITE}(t) \approx m*a(t) \text{ (when } F_{TE} > 0\text{);}$$

$$F_{ITE}(t) \approx 0 \text{ (otherwise); and}$$

where $F_{TE}$ is the total tractive effort.

When using sampled data (e.g. from a locomotive event recorder), the integral can be estimated as:

$$cITE = \Sigma F_{ITE}(i) * v(i) * \Delta T$$

where:
$F_{ITE}(i)$ is the $i^{th}$ calculated value of $F_{ITE}$,
v(i) is the $i^{th}$ sample of v and
$\Delta T$ is the sampling interval.

For example, which is not to be considered limiting, when the sampling interval is 1 second (as commonly used in locomotive event recorders), the estimate can be further simplified to:

$$cITE = \Sigma F_{ITE}(i) * v(i)$$

A locomotive may be powered by diesel or electricity, and it may be used in isolation, or attached to one or more rail cars. A locomotive typically does not regenerate power during use, which is understood to mean that fuel or energy is no reclaimed by the train while coasting or braking.

With reference to FIG. 1A there is depicted a model that outlines several forces that may be involved in determining the total tractive effort ($F_{TE}$; 30; upper panel of FIG. 1A) and the inertial tractive effort ($F_{ITE}$; 40; lower panel of FIG. 1A) of a train (10) during a train run. The train (10) is idealized as a single mass (m), with locomotive force being applied to move the mass against resistance. As shown in the upper portion of FIG. 1A, when the train (10) is moving at a constant speed (v), the total tractive effort ($F_{TE}$; 30) applied by the locomotive(s) balances the various resistances (20) to the direction of motion. These resistances may include but are not limited to, resistance due to rolling ($R_{tangent}$), curves ($R_{curves}$), grades ($R_{grade}$) 1 wind ($R_{wind}$) and the like. As shown in the lower portion of FIG. 1A, if the same train (or a second similar train; 10) is travelling at speed (v) and with acceleration (a), the locomotive(s) applies an additional force to overcome an inertial resistance to acceleration. This additional inertial resistance to acceleration, or "Inertial Tractive Effort" ($F_{ITE}$; 40) can be estimated using Newton's Second Law as $F_{ITE} \approx ma$.

As the inertial tractive effort, $F_{ITE}$, acts over a given distance, the amount of energy that has been spent (or fuel consumed) in accelerating the train (versus the same train or a similar second train, travelling at a constant speed over the same distance) can be estimated. Under field conditions and in the absence of regenerating or reclaiming power during use, any energy spent in acceleration is not reclaimed during deceleration. Therefore, a vehicle that is frequently accelerating and decelerating will require more energy to travel a given distance over a given time than the same vehicle, or a similar second train, travelling at a constant speed (see for example lower panel of FIG. 2).

Assuming the use of diesel-electric trains that are not regenerative, several scenarios are outlined in Table 1 that may impact the determination of cITE for a train run.

TABLE 1

Scenarios and implications on inertial tractive effort ($F_{ITE}$)

| Scenario | Implication |
|---|---|
| 1: train is travelling at a constant speed | no difference in force required (i.e. energy spent) by train when compared to the same, or a second similar train travelling at same constant speed. |
| 2*: train is accelerating under tractive effort (i.e. in Notch 1 or higher) | train requires more force (more energy) versus the same, or a second similar train travelling at a constant speed. |
| 3*: train is decelerating under tractive effort (i.e. in Notch 1 or higher) | train requires less force (less energy) versus the same, or a second similar train travelling at a constant speed. |
| 4: train is accelerating or decelerating without tractive effort applied (i.e., coasting or braking) | no locomotive energy is spent or reclaimed |

*to estimate the amount of incremental energy spent (or saved) versus a second train travelling at a constant speed, the effects of variations in speed (v) due to acceleration (a) on rolling resistance ($R_{tangent}$) are neglected.

Figure 1B:
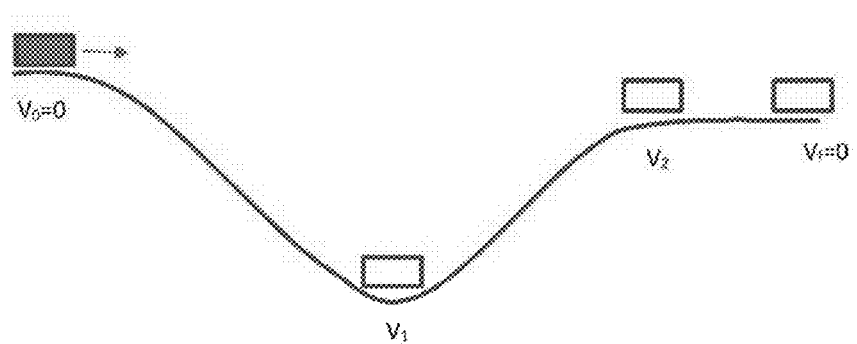

In scenarios 1 or 4 of Table 1, there is no inertial tractive effort ($F_{ITE}$), therefore, the value for cITE would be 0. In scenario 2, an increase in force (inertial tractive effort; $F_{ITE}$) is required to accelerate the train, therefore under these conditions, there will be a positive cITE value. In scenario 3 the force required is less than a train travelling at constant speed, as a result the cITE value will be negative (also see discussion of FIG. 1B below).

In order to estimate the total energy spent on inertial effects (i.e. acceleration/deceleration versus the same train travelling at a constant speed) over a given run under field conditions, locomotive event recorder data is used as follows:

i) Runs may be calculated for any portion of rail track that is used for a train run, for example, between crew change points, provided that they have the same start and end points for each of the reference train run and the test train run. The speeds of the train run at the start and end points of the portion of track are zero. If one or both of the start and end speeds are not the same then the runs are not comparable and the train run is discarded from the data set.

ii) Event recorder speed data is smoothed using, for example, using a discrete-time low-pass filter, or other method as would be known to one of skill in the art, to remove any outlier values ("spikes"; large instantaneous values), to result in the estimate of acceleration due to discrete changes in the recorded value of speed. For example, a simple low-pass filter of the following form can be used to smooth speed data:

$$v(i) = \alpha * s(i) + (1-\alpha) * v(i-1)$$

where
s(i) is the $i^{th}$ sample of speed, as obtained from the event recorder,
v(i) is the $i^{th}$ calculated (smoothed) value of speed, and
α is a filter parameter.

The filter parameter, α, can be selected to optimize the balance between rejection of noise in the signal and preservation of characteristic frequencies. A similar approach may also be used to calculate smoothed values of acceleration: a(i) from the raw speed data. Values of, for example, speed: v(t), and acceleration: α(t), of the train are calculated at regular sample intervals (t), for example but not limited to, at 1-second sampling intervals. However, it is to be understood that sampling intervals of other durations may be used, for example from about 0.1 sec to about 30 min, or any time therebetween may be used, for example, sampling intervals of 0.1, 0.2, 0.3, 0.4, 0.5, 0.6, 0.7, 0.8, 0.9, 1.0, 1.5, 2.0, 3.0, 4.0, 5.0, 10.0, 15.0, 20.0, 25.0, 30.0, 35.0, 40.0, 45.0, 50.0, 55.0, 60.0 sec, or any time therebetween, or sampling intervals of 1, 1.5, 2, 2.5, 3, 3.5, 4, 4.5, 5, 5.5, 6, 6.5, 7, 7.5, 8, 8.5, 9, 9.5, 10, 12, 14, 16, 18, 20, 22, 24, 26, 28, 30 minutes, or any time therebetween.

iii) For each sampling interval (t) of event recorder data the inertial tractive effort ($F_{ITE}$) is $F_{ITE}(t) \approx m*a(t)$, when $F_{TE} > 0$; otherwise $F_{ITE}(t) \approx 0$.

iv) For each sampling interval (t), the inertial tractive power may be determined using: $F_{ITE}(t)*V(t)$.

v) The total inertial tractive energy (cumulative ITE) for the train run can then be determined by integrating the inertial tractive power obtained at each sample period using the formula provided above for cITE. For example, which is not to be considered limiting, if the sampling interval is 1 second, then the cumulative ITE (cITE) is given as:

$$F_{ITE}(i)*v(i),$$

where (i) is the $i^{th}$ sampling interval and
the sampling interval ΔT is 1 sec.

cITE may be used as an estimate of the energy spent on the cumulative acceleration/deceleration of the train during a train run, either a test train run or a reference train run. The cumulative ITE for a run characterizes the train handling for the run, and provides an explanatory variable for fuel/energy consumption during the train run.

Figure 2:
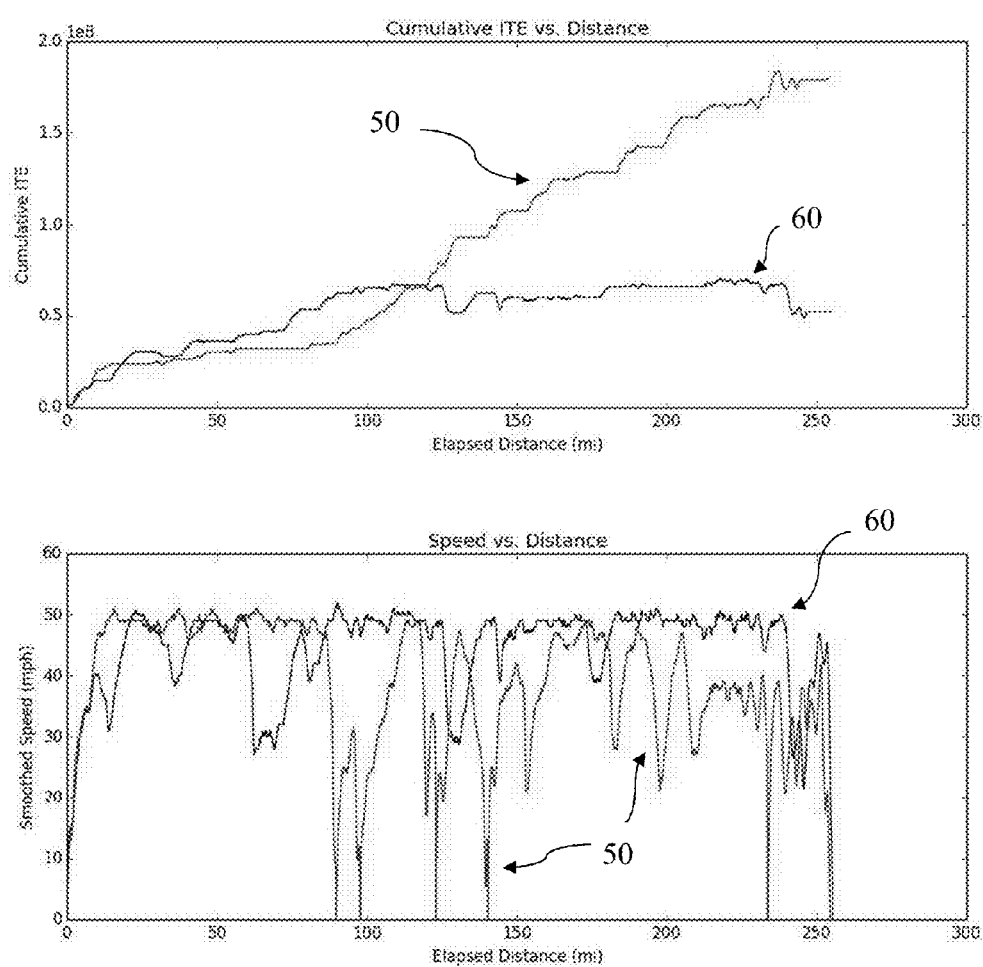
FIG. 2 shows example plots of two different train runs by different train operators (drivers) on the same territory and over the same section of track. Upper plot: change in cumulative ITE over distance; Lower plot: changes in speed over distance.

As an example, with reference to FIG. 2 there is shown a change in cITE (upper panel) or speed (lower panel) for two similar train runs over the same territory and portion of track, but the trains are operated by different drivers. The cumulative ITE value reached at the end of the run corresponds to the final cITE value for each of the train runs. The upper trace (50) in the upper panel of FIG. 2, and the lower trace (50) of the lower panel of FIG. 2 are for the same train run which is characterized as having more frequent acceleration and deceleration resulting in higher corresponding cumulative ITE by the end of the run when compared to a second train run (60) that is characterized as having fewer and less intense periods of acceleration and deceleration.

Determination of cITE provides an explanatory variable that helps to reduce the degree of uncertainty in the analysis of the impacts of an operating parameter on locomotive fuel/energy consumption. For example, a set of fuel measurements $F_i$; i=1 . . . n, is obtained from locomotives operating on a given route (train run) under field conditions. Under field conditions, the fuel measurements may or may not be normalized by train tonnage. In order to account for impacts of various factors to determine the effect of an operating parameter on fuel consumption the following equation may be used:

$$F_i = \beta_1 x_{i1} + \beta_2 x_{i2} + \ldots + \beta_n x_{in} + \epsilon_i$$

Where,
$F_i$ are the measured variables (for example, fuel measurements), $x_1, x_2, \ldots, x_n$ are the explanatory variables,
$\beta_1, \beta_2, \ldots \beta_n$, are the coefficients of the explanatory variable (which are to be determined) and
$\epsilon_i$ is an "unobserved" random variable that adds noise (uncertainty) to the measured values ($F_i$),
i is the number of sampling (or data collection) points.

The equation is solved using any suitable method as would be understood to one of skill in the art, for example, using multivariable linear regression.

The explanatory variables would include all measured variables that are considered to have an impact or potential impact on fuel consumption, including the change in the operating parameter that is being evaluated. Explanatory variables can be continuous (for example. train length, temperature, and the like), discrete (on/off), or constant.

When evaluating the effect of an operating parameter, for example which is not to be considered limiting, Top of Rail (TOR) friction modifier (FM) application on fuel consumption ($F_i$), a discrete explanatory variable $x_{TOR}$ may be introduced, and assigned a value of $x_{TOR}=0$ under baseline conditions, and $x_{TOR}=1$ when the operating parameter TOR FM is applied. Typically a constant explanatory variable ($x_c=1$) is also included to allow for a non-zero intercept ($\beta_c$).

Solving the equation results in a series of coefficients $\beta_1$, $\beta_2, \ldots \beta_n$ that indicate the degree to which each explanatory variable affects fuel consumption, as well as any residual variation (represented above as $\epsilon_i$). The strength of correlation between explanatory variables and the measured variable may also be determined.

Referring to the example explanatory variable $x_{TOR}$, the corresponding coefficient $\beta_{TOR}$ would represent the change in fuel consumption due to TOR application.

Due to the large inherent variability in locomotive fuel consumption, the residual variation following this type of regression may be quite large and it may be difficult to measure the effects of a given change with statistical confidence. The introduction of cITE provides an additional explanatory variable when determining fuel consumption. cITE is a continuous variable that reflects the net energy spent in acceleration/deceleration (due to for example train handling). When including an explanatory variable $x_{cITE}$, the resulting coefficient $\beta_{cITE}$ indicates sensitivity to train handling. If the variable $x_{cITE}$ is correlated with fuel consumption then the residual variation will be decreased and the explanatory power of the data set improved for the purpose of evaluating a change in an operating parameter that is introduced during a train run.

With improved statistical power due to inclusion of cITE as an explanatory variable it is possible to detect a given change associated with an operating parameter with statistical confidence using fewer measurements, or a smaller change may be determined using the same number of measurements.

Cumulative ITE correlates well with fuel consumption and functions as an explanatory variable, to reduce variability in data sets obtained from a train run. The use of cITE values to correct for fuel/energy consumption for a train run results in improved confidence when analyzing the impacts of other variables (operating parameters) on fuel/energy consumption during or after a train run. A non-limiting example of an operating parameter is application of a friction modifying composition, for example, top of rail (TOR) Friction Modifier application. Examples of friction modifying compositions are known in the art and may include solid, liquid or paste-like friction control media for example, but are not limited to, those described in U.S. Pat. No. 5,173,204; U.S. Pat. No. 5,308,516; U.S. Pat. No.

6,136,757; U.S. Pat. No. 6,387,854; U.S. Pat. No. 5,492,642; US 2004 0038831 A1; WO 02/26919 (US 2003 0 195 123 A1); WO 98/13445; CA 2,321,507; EP 1 357 175; EP 1 418 222; U.S. Pat. No. 6,795,372; U.S. Pat. No. 6,855,673; U.S. Pat. No. 7,045,489; U.S. Pat. No. 7,244,695; U.S. Pat. No. 7,357,427; U.S. Pat. No. 7,709,426; WO 2006/084386; WO 2008/089572 (which are incorporated herein by reference).

cITE may be used in the following way to determine a correction factor to account for variability due to driver behaviour when evaluating fuel/energy consumption during a train run.

Reference Train Runs:

determine, or obtain pre-obtained, data from a number (m) of reference train runs, made with consistent train types and locomotives over a given route (or portion of track). Fuel spent on each run, either absolute or normalized by tonnage (or other additional variable for example train length), can be denoted Freference$_i$; where i=1 ... m calculate cITE for all reference runs, and use a linear regression of Freference$_i$ vs cITE$_i$ to establish the correlation Freference=$\alpha$1+$\beta$1*cITE calculate the "corrected" reference values: Freference, corrected$_i$=Freference$_i$−$\beta$1*cITE$_i$ as noted above, the corrected reference values for one or more reference train runs may be predetermined and stored for a given portion of track (or given route).

Test Train Runs:

determine, or obtain pre-obtained, data from a number (n) of "test" train runs, made with consistent train types and locomotives over the same given route (or portion of track) and with the implementation of a change to an operating parameter (for example, TOR application, addition of a faring, modify a bearing type, fuel additive, and the like). Fuel spent on each run (either absolute or normalized by tonnage) can be denoted Ftest$_j$; j=1 ... n calculate cITE for all test runs, and use a linear regression of Ftest$_j$ vs cITE$_j$ to establish the correlation Ftest=$\alpha$2+$\beta$2*cITE calculate the "corrected" values: Ftest, corrected$_j$=Ftest$_j$−$\beta$2*cITE$_j$ The impact of the change in an operational parameter during the test train run on fuel/energy consumption may be estimated as the difference between the average values of Freference, corrected and Ftest, corrected, with the corresponding sample counts (m, n) and variances used to determine statistical significance. For a given set of sample sizes (m, n), the reduction in variability resulting from the cITE-based corrections on determining fuel/energy consumption will result in an increased explanatory power. Alternatively, the same explanatory power will be achieved using a reduced number of samples. The number of samples (m, n) required to obtain a statistically significant measurement will depend on the underlying variance in the fuel consumption distributions, and the magnitude of the change in fuel consumption resulting from the change in an operational parameter.

Analysis of inertial tractive effort (ITE) and determination of cumulative ITE (cITE) from a range of train runs indicates that train runs with negative cITE values may be obtained. For example, with reference to FIG. 1B, a train begins at rest with speed $V_0$=0, the train accelerates by gravity with no throttle applied, to the bottom of a grade where it reaches a speed $V_1$. Throttle is applied as the train travels to the top of the subsequent grade where it arrives with a speed $V_2$. The train decelerates with no throttle applied, until it comes to rest with $V_f$=0. All resistances (rolling resistance, curving resistance, grade resistance, wind resistance, etc.) are equal between train runs, and $V_2$ is equal for each train run:

Case I: $V_2 < V_1$, and deceleration from $V_1$ to $V_2$ is monotonic (i.e. acceleration is constantly negative). The calculated ITE at any point between $V_1$ and $V_2$ will be negative. Since ITE will be zero between V0 and $V_1$ and between $V_2$ and $V_f$, the cumulative ITE (cITE) is negative. The fuel spent on acceleration will be at a minimum, since most of the gravitational energy in the forward momentum of the train is utilized.

Case II: $V_2 = V_1$, and there is no acceleration or deceleration from $V_1$ to $V_2$ (i.e. acceleration is constantly zero). The calculated ITE at any point between $V_1$ and $V_2$ will be zero. Since ITE will be zero between $V_0$ and $V_1$, and between $V_2$ and Vf, the cumulative ITE (cITE) is zero. The fuel spent on acceleration will be higher in Case II, than in Case I, since $V_1$ is lower in Case II (than in Case I), and less gravitational energy in the forward momentum of the train is preserved.

Case III: $V_2 > V_1$, and acceleration from $V_1$ to $V_2$ is monotonic (i.e. acceleration is constantly positive). The calculated ITE at any point between $V_1$ and V2 will be positive. Since ITE will be zero between $V_0$ and $V_1$ and between $V_2$ and $V_f$, the cumulative ITE (cITE) is positive. The fuel spent on acceleration is highest in Case III when compared to Case I or II. In Case III, $V_1$ is at its lowest and the least gravitational energy in the forward momentum of the train is preserved. When compared to Case I or II.

The following examples are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Example 1

Locomotive event recorder and fuel usage data was collected from revenue service traffic operating on 175 miles of track between South Morrill, Nebr. and North Platte, Nebr. in Union Pacific's coal network. Traffic consisted of heavy haul (typically 286,000 lb gross weight when loaded) vehicles operating on standard gauge North American track, with rail cross sections of 136 lb or heavier (standard an premium rail quality), with concrete or wood ties on standard North American ballast and subballast track structure. Curvature in the territory is relatively mild, with rolling grades of (typically)+/−0.5%. Data was collected from both loaded and empty traffic, with loaded traffic experiencing a predominantly descending grade over the traversed routes.

Reference and test data was obtained from 1000 train runs over a 3 month period comprising 135-145 cars of a similar type and tonnage travelling over 175 miles of track. From this data set, 40 valid reference train runs were found to meet the require criteria for determining cITE as outlined above (start and end points were the same; start and end points had a zero velocity; train runs were over the same portion of track). The results of these valid train runs are shown in FIG. 3.

Figure 3:
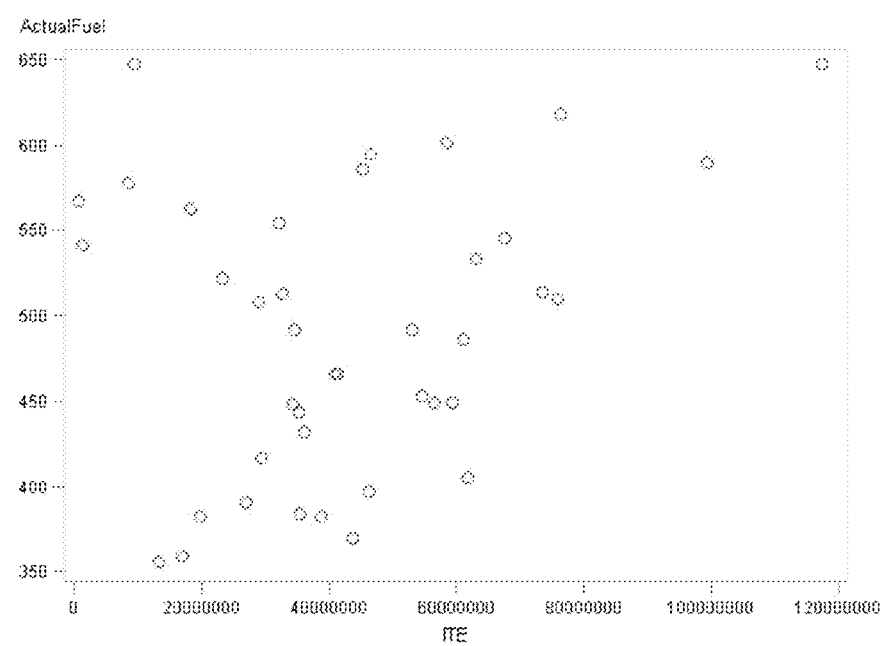
FIG. 3 shows fuel consumption data for 44 different train runs as plotted against cumulative ITE (ITE).

FIG. 3 shows the variability in fuel consumption for different cITE values as determined from valid train run data sets. The variability in fuel consumption during a train run, may result for example, from differences in train idling time; differences in train length; differences in weather and environmental conditions; differences in wear of the bearings; differences in brake adjustment (e.g. brake rubbing) and the like.

Example 2

Locomotive event recorder and fuel usage data was collected from revenue service traffic operating on 245 miles of track between North Platte, Nebr. and Marysville, Kans. in Union Pacific's coal network. Traffic consisted of heavy haul (typically 286,000 lb gross weight when loaded) vehicles operating on standard gauge North American track, with rail cross sections of 136 lb or heavier (standard an premium rail quality), with concrete or wood ties on standard North American ballast and subballast track structure. Curvature in the territory is relatively mild, with rolling grades of (typically)+/−0.25%. Data was collected from both loaded and empty traffic, with loaded traffic experiencing a predominantly descending grade over the traversed routes Reference and test data was obtained from 690 trains runs over a 3 month period comprising 135-145 cars of a similar type and tonnage travelling over 245 miles of track. For the test train runs, a top of rail friction modifying composition was applied at a rate of 60 mL/mile, over a distance of 245 miles, as an example of a modified operating parameter.

From this data set, 76 valid reference train runs and 14 valid test runs, were found to meet the require criteria for determining cITE as outlined above (start and end points were the same; start and end points had a zero velocity; train runs were over the same portion of track). The results of these valid train runs are shown in FIGS. 4A and 4B.

Figure 4A:
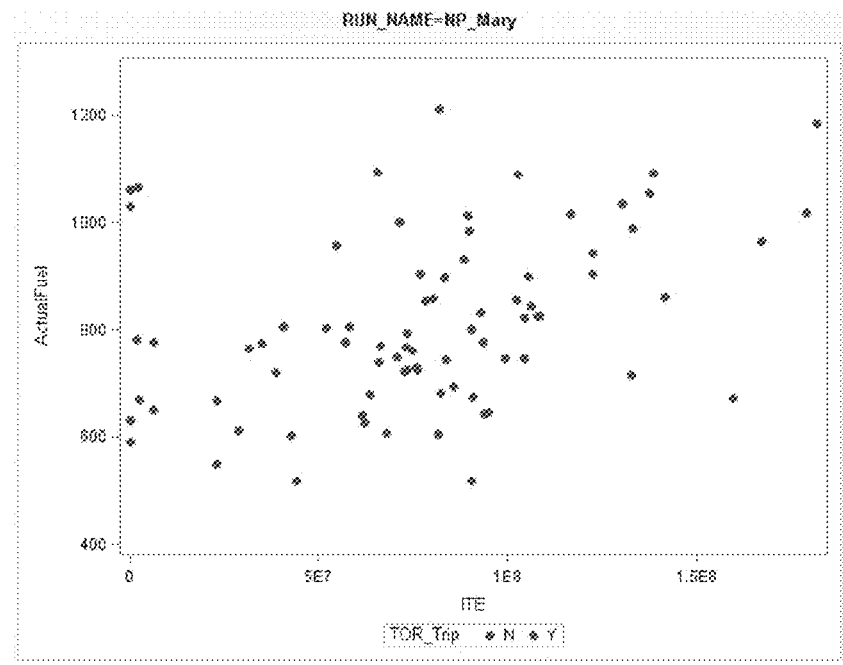
FIGS. 4A and 4B show fuel consumption data for 80 train runs.

FIG. 4A shows the variability in fuel consumption for different cITE values as determined from valid reference and test train run data sets. The variability in fuel consumption during a train run, may result for example, from differences in train idling time; differences in train length; differences in weather and environmental conditions; differences in wear of the bearings; differences in brake adjustment (e.g. brake rubbing) and the like.

Figure 4B:
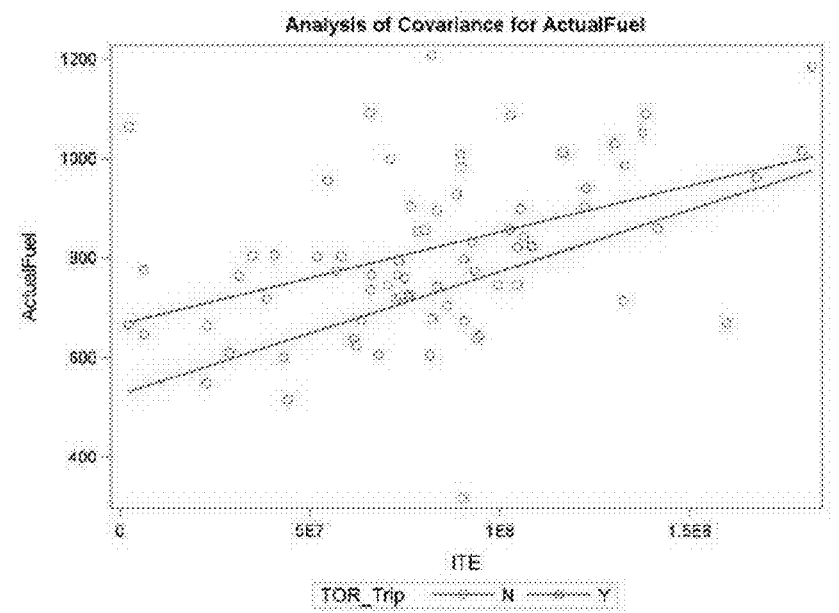

FIG. 4B shows regression lines for the reference train run (upper line, FIG. 4B) and test train runs (lower line FIG. 4B), and show that the operating parameter (top of rail friction modifying composition application) resulted in lowering fuel consumption.

In the absence of incorporating cITE as an explanatory variable, a multi-variable linear regression estimates the impact of top of rail friction modifier application on locomotive fuel usage as 13.9 USG/trip, with a p-value of 0.627. By incorporating cITE as an explanatory variable, a multi-variable linear regression estimates the impact of top of rail friction modifier application on locomotive fuel usage as −23.1 USG/trip, with a p-value of 0.288. While neither result would be interpreted as statistically significant, the improvement in explanatory power gained through the use of cITE as an explanatory variable is demonstrated.

Example 3

Locomotive event recorder and fuel usage data was collected from revenue service traffic operating on Union Pacific's coal network in Nebraska and Kansas. Traffic consisted of heavy haul (typically 286,000 lb gross weight when loaded) vehicles operating on standard gauge North American track, with rail cross sections of 136 lb or heavier (standard an premium rail quality), with concrete or wood ties on standard North American ballast and subballast track structure.

Reference and test data was obtained from 1903 trains runs over a 5 month period comprising 135-145 cars of a similar type and tonnage travelling over a variety of routes in the network. For the test train runs, a top of rail friction modifying composition was applied at a rate of 30-60 mL/mile, depending on the specific route and conditions, as an example of a modified operating parameter.

From this data set, 294 valid reference train runs and 93 valid test runs, were found to meet the require criteria for determining cITE as outlined above (start and end points were the same; start and end points had a zero velocity; train runs were over the same portion of track).

In the absence of incorporating cITE as an explanatory variable, a multi-variable linear regression estimated the impact of top of rail friction modifier application on locomotive fuel usage as −26.4 USG/trip, with a p-value of 0.202. By incorporating cITE as an explanatory variable, a multi-variable linear regression estimated the impact of top of rail friction modifier application on locomotive fuel usage as −50.9 USG/trip, with a p-value of 0.028. The latter result can be assessed as statistically significant, and demonstrates the explanatory power of cITE given a limited data set.

These data demonstrating that the correction of fuel consumption using cITE reduces the variability in determining fuel/energy consumption and results in an increased explanatory power associated with the modified operating parameter during a train run.

What is claimed is:

1. A method to determine fuel consumption, energy consumption, or both fuel consumption and energy consumption of a train, during a test train run, or two or more than two test train runs, that is associated with modifying an operating parameter of the train or a track, the method comprising:
  i) determining a reference fuel consumption, reference energy consumption, or both the reference fuel consumption and the reference energy consumption, and a cumulative ITE for a reference train run or two or more than two reference train runs, ($CITE_{RR}$) over a portion of track;
  ii) correcting the reference fuel consumption, the reference energy consumption, or both the reference fuel consumption and the reference energy consumption, of the reference run or two or more than two reference train runs by using the $CITE_{RR}$ of the reference train run or two or more than two reference train runs, to produce a corrected reference fuel/energy consumption value;
  iii) modifying and implementing the operating parameter of the train or the track;
  iv) determining a modified fuel consumption, a modified energy consumption, or both the modified fuel consumption and the modified energy consumption, and cumulative ITE for the test train run or two or more than two test train runs ($CITE_{RR}$), over the portion of track;
  v) correcting the modified fuel consumption, the modified energy consumption, or both the modified fuel consumption and the modified energy consumption, for the test train run or two or more than two test train runs by using the $CITE_{TR}$ of the test train run or two or more than two test train runs, to obtain a corrected test fuel/energy consumption value;

vi) comparing the corrected reference fuel/energy consumption value and the corrected test fuel/energy consumption value; and vii) determining the effect of modifying the operating parameter of the train or the track on the fuel consumption, the energy consumption, or both the fuel consumption and the energy consumption, during the test train run or two or more than two test train runs.

2. The method of claim 1, where in the step of determining (step i), and in the step of modifying (step iii), three or more than three reference train runs and three or more than three test train runs are performed.

3. The method of claim 1, wherein in the step of comparing (step vi), any variation in tonnage between the reference train run or two or more than two reference train runs, and the test train run or two or more that two test runs, are corrected for.

4. The method of claim 1, wherein the corrected reference fuel/energy consumption value is obtained for a plurality of reference train runs and each of the corrected reference fuel/energy consumption values are averaged before the step of comparing (step vi).

5. The method of claim 1, wherein the corrected test fuel/energy consumption value is obtained for a plurality of test train runs and each of the corrected test fuel/energy consumption values are averaged before the step of comparing (step vi).

6. The method of claim 1, wherein the operating parameter is selected from the group of an application of a friction control modifier to a rail or wheel surface, a change in the type of fuel used, using or modifying an aerodynamic faring, using or modifying a wind skirt, modifying wheel bearings, modifying wheel bearing grease, modifying a wheel material, altering acceleration, deceleration or bother acceleration and deceleration during certain segments of a track, or altering rail track configuration.

7. A method to determine fuel consumption, energy consumption, or both fuel consumption and energy consumption of a train, during a test train run or two or more than two test train runs, that is associated with modifying an operating parameter of the train or a track, the method comprising:

i) modifying and implementing the operating parameter of the train or the track;

ii) determining a modified fuel consumption, a modified energy consumption, or both the modified fuel consumption and the modified energy consumption, and cumulative ITE for the test train run or two or more than two test train runs ($CITE_{TR}$), over a portion of track;

iii) correcting the modified fuel consumption, the modified energy consumption, or both the modified fuel consumption and the modified energy consumption, for the test train run or two or more than two test train runs by using the $CITE_{TR}$ of the test train run or two or more than two test train runs, to obtain a corrected test fuel/energy consumption value; and iv) comparing the corrected test fuel/energy consumption value with a predetermined corrected reference fuel/energy consumption value; and v) determining the effect of modifying the operating parameter on the fuel consumption, the energy consumption, or both the fuel consumption and the energy consumption, during the test train run or two or more than two test train runs.

8. The method of claim 7, wherein in the step of comparing (step iv), the predetermined reference fuel/energy consumption value is obtained by determining a reference fuel consumption, reference energy consumption, or both the reference fuel consumption and the reference energy consumption, and a cumulative ITE for a reference train run or two or more than two reference train runs ($CITE_{RR}$), over the portion of track, and correcting the reference fuel consumption, the reference energy consumption, or both the reference fuel consumption and the reference energy consumption, of the reference run or two or more that two reference train runs, using the $CITE_{RR}$ of the reference train run or two or more than two reference train runs, to produce the predetermined corrected reference fuel/energy consumption value.

9. The method of claim 8, wherein any variation in tonnage between the reference train run or two or more than two reference train runs, and the test train run or two or more than two test train runs, are corrected for.

10. The method of claim 8, wherein the predetermined corrected reference fuel/energy consumption value is obtained for a plurality of reference train runs and each of the predetermined corrected test fuel/energy consumption values are averaged for use within the step of comparing (step iv).

11. The method of claim 7, where in the step of modifying (step i), and in the step of comparing (step iv), three or more than three reference train runs and three or more than three test train runs are performed.

12. The method of claim 7, wherein in the step of comparing (step iv), any variation in tonnage between a reference train run or two or more than two reference train runs, and the test train run or two or more than two test train runs, are corrected for.

13. The method of claim 7, wherein the predetermined corrected reference fuel/energy consumption value is obtained for a plurality of reference train runs and each of the predetermined corrected test fuel/energy consumption values are averaged for use within the step of comparing (step iv).

14. The method of claim 7, wherein the corrected test fuel/energy consumption value is obtained for a plurality of test train runs and each of the corrected test fuel/energy consumption values are averaged for use in the step of comparing (step iv).

15. The method of claim 7, wherein the operating parameter is selected from the group of an application of a friction control modifier to a rail or wheel surface, a change in the type of fuel used, using or modifying an aerodynamic faring, using or modifying a wind skirt, modifying wheel bearings, modifying wheel bearing grease, modifying a wheel material, altering acceleration, deceleration or bother acceleration and deceleration during certain segments of a track, or altering rail track configuration.

* * * * *